US012505276B2

(12) United States Patent
Ginetti

(10) Patent No.: US 12,505,276 B2
(45) Date of Patent: Dec. 23, 2025

(54) METHOD AND SYSTEM TO FACILITATE SCHEMATICS FOR AN ELECTRONIC DESIGN

(71) Applicant: Cadence Design Systems, Inc., San Jose, CA (US)

(72) Inventor: Arnold Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 654 days.

(21) Appl. No.: 17/809,898

(22) Filed: Jun. 30, 2022

(65) Prior Publication Data

US 2024/0005081 A1 Jan. 4, 2024

(51) Int. Cl.
*G06F 30/398* (2020.01)
*G06F 30/12* (2020.01)

(52) U.S. Cl.
CPC ............ *G06F 30/398* (2020.01); *G06F 30/12* (2020.01)

(58) Field of Classification Search
CPC .................................................... G06F 30/398
USPC ......................................................... 716/139
See application file for complete search history.

(56) References Cited

U.S. PATENT DOCUMENTS

| 10,783,292 | B1 | 9/2020 | Clewes et al. | |
|---|---|---|---|---|
| 2011/0107281 | A1* | 5/2011 | Sun | G06F 30/398 |
| | | | | 716/139 |

OTHER PUBLICATIONS

Cadence, Cadence SiP Design, Connectivity-driven co-design and implementation of full system in package, Date identified for the document is from google.com is Jan. 2017.
Cadence, Orcad Capture, User's Guide, Second Edition, Dated May 2000.
Cadence, LEF/DEF Language Reference, Product Version 5.7, Dated Nov. 2009.
Cadence Virtuoso Tutorial, Version 6.1, University of Southern California, EE209—Fall 2015, Last updated Oct. 2015.
Cadence, User's Guide for Virtuoso® Analog Design Environment, Product Version 5.1.41, Dated Sep. 2006.
Altium, "Differences", Altium Documentation, Dated Jul. 2020.
Mitchell, B., "Novation Circuit Tracks vs Circuit—Worth The Upgrade?", URL:https://wavelength.focuscamera.com/novation-circuit-tracks-vs-circuit-worth-the-upgrade/, Dated Apr. 2021.
Glitch, D., "Review: Novation's Circuit Tracks is an even better Circuit groovebox" URL: https://djtechtools.com/2021/05/27/review-novations-circuit-tracks-is-an-even-better-circuit-groovebox/, Date identified for the document from google.com is May 2021.
Jiang, J. et al, "Engineering Change Order for Combinational and Sequential Design Rectification", Design, Automation And Test in Europe (DATE 2020), Dated 2020.
Krishnegowda, D., "A primer on engineering change order (ECO) using Conformal", EDN, Design, IC Designer's Corner, Dated Nov. 2021.

(Continued)

*Primary Examiner* — Eric D Lee
(74) *Attorney, Agent, or Firm* — Vista IP Law Group, LLP

(57) ABSTRACT

Disclosed is a method and system for visualizing schematic changes for an electronic design, where multiple schematic view interfaces are provided such that a first schematic interface displays an older schematic version and a second schematic interface displays a newer schematic version. Coordination is performed between the multiple schematic views such that an element within any of the first or second schematic views is appropriately highlighted based upon a user input.

21 Claims, 18 Drawing Sheets

(56) References Cited

OTHER PUBLICATIONS

Xilinx, Vivado Design Suite User Guide, Design Flows Overview, Vivado Design Suite, UG892 (v2022.1), Dated Apr. 2022.
Aras, User's Guide for Aras Innovator Product Engineering 14, Document #: 14.0.02021061201, dated Oct. 2021.
Mentor Graphics, PADS Layout Tutorial, Date identified for the document from google.com is Aug. 2017.
Non-Final Office Action dated Dec. 10, 2024 for U.S. Appl. No. 17/809,899.
Notice of Allowance dated Mar. 20, 2025 for U.S. Appl. No. 17/809,899.

* cited by examiner

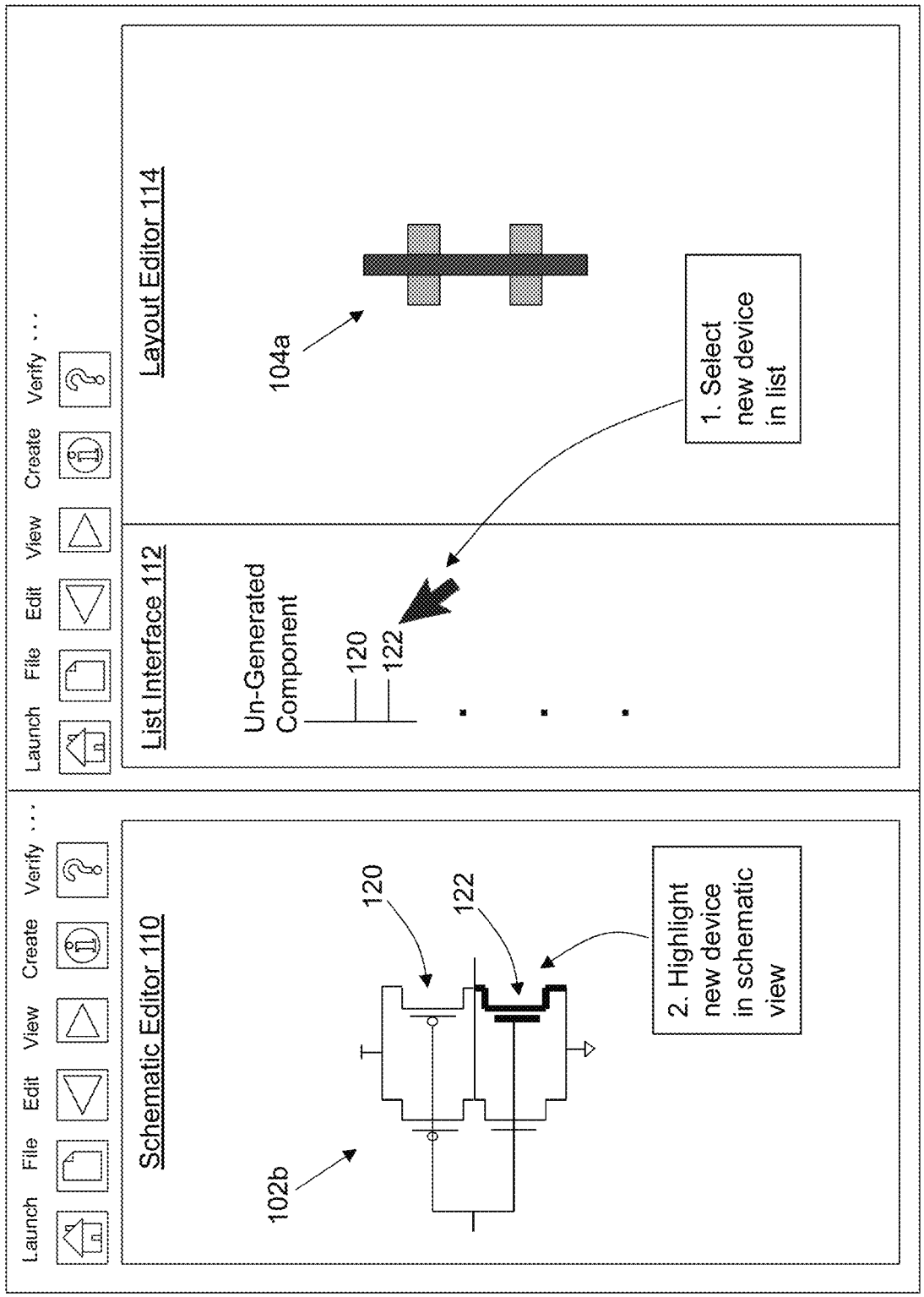

METHOD AND SYSTEM TO FACILITATE SCHEMATICS FOR AN ELECTRONIC DESIGN

FIELD

The invention relates to the implementation of electronic designs, such as the design of Integrated Circuits (ICs).

BACKGROUND

A semiconductor integrated circuit has a large number of electronic components, such as transistors, logic gates, diodes, wires, etc., that are fabricated by forming layers of different materials and of different geometric shapes on various regions of a silicon wafer. A "schematic" is often used to provide a map or diagram of the circuitry for the integrated circuit. The schematic will typically use a presentation of standardized symbols to represent the components and interconnections in the circuit design. It is important to understand, however, that the pictorial presentation of the symbolic elements within the schematic does not necessarily represent or correspond to the exact arrangement of the physical shapes of the final circuit product embodied as the integrated circuit. Instead, during the design process, the schematic will be converted into a physical layout that corresponds to the physical location and placement of the geometric shapes that would implement the circuitry elements represented in the schematic. While the schematic designer may include the set of devices and interconnects that are needed for the design within the schematic, it is often up to a layout designer to transform that schematic into the specific placement of the physical geometric shapes at the appropriate locations on the physical substrate(s) to realize the intended circuitry in a manner that would function as desired without incurring any manufacturing-related errors (such as shorts, opens, or unintentional electrical interference between components).

During the sequence of workflow actions that are taken to form and finalize the electronic design, it is often the case that a designer will need to revise or edit the design. For example, an ECO (engineering change order) is a term that refers to a formal process of initiating an alteration or change to a design after an initial design phase has already been completed. In the field of electronic design, the ECO may be issued after the initial design phase has already resulted in the completion of an initial schematic that has been successfully transformed into a layout that is LVS (layout versus schematic) correct. The ECO may result in the creation of a modified schematic that changes some aspect of the original schematic.

When the revised schematic is passed from the schematic designer to the layout designer, it is often very helpful for the layout designer to be able to visually see and understand the distinctive changes that have occurred between the earlier version of the schematic and the later version of the schematic, especially as these schematic changes relate to the layout. By way of an analogy, this is somewhat similar to the way in which multiple editors of a text document may find it helpful to turn on "Track Changes" to comprehend the scope and extent of changes by different editors to the same text document.

The problem addressed by this disclosure is that conventional electronic design tools do not provide a comprehensively effective or efficient approach to visually represent changes to the schematic to the designer. When the change to a schematic involves the addition of a new device or interconnect to the schematic, then it is often possible to visually highlight the new device or interconnect in a user interface. However, if the revised schematic results in the removal or deletion of an element from the schematic, then conventional electronic design tools typically do not provide a visually effective way to show that change.

Therefore, there is a need for an improved approach to facilitate the design of electronic circuits, particularly with respect to changes that are made to a schematic for the electronic design.

SUMMARY

Embodiments of the invention provide an improved method and system for visualizing schematic changes for an electronic design, where multiple schematic view interfaces are provided such that a first schematic interface displays an older schematic version and a second schematic interface displays a newer schematic version. Coordination is performed between the multiple schematic views such that an element within any of the first or second schematic views is appropriately highlighted based upon a user input.

Other and additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 1A-E provide an illustration of certain background details regarding a schematic change to an electronic design.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIGS. 1A-E provide an illustration of certain background details regarding an approach to visually display a schematic change to an electronic design. The electronic design process typically operates by designing representations of the circuit at different levels of abstraction.

Figure 1A:
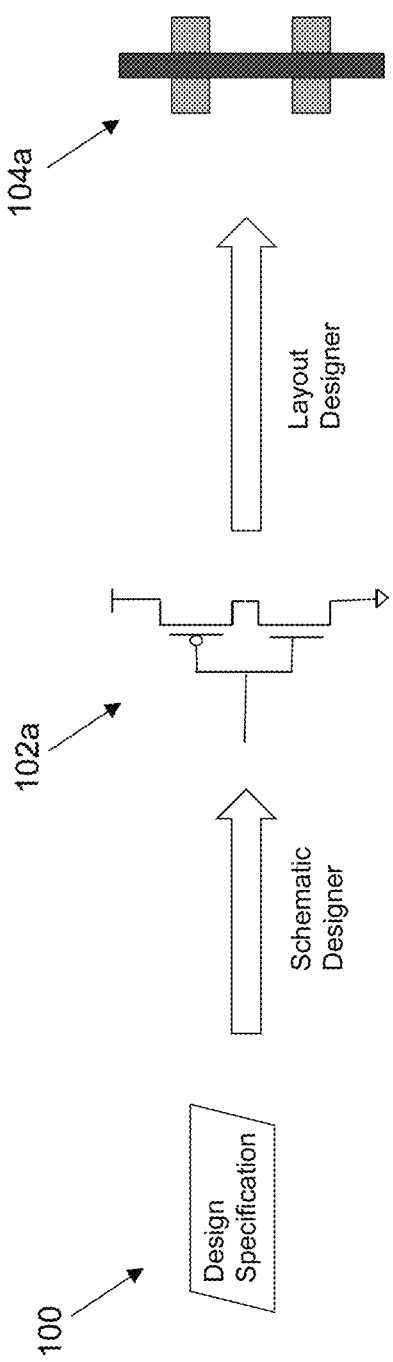

As shown in FIG. 1A, the electronic design process may involve the creation of one or more design specifications 100 at a very high level of abstraction. For example, the design specification 100 may correspond to a behavioral description of the intended functions of the electronic design, as well as specifications pertaining to performance, cost, size, interface, and/or power requirements. A schematic designer may use the design specification 100 to create a schematic representation 102a of the electronic design. The schematic 102a may include a symbolic representation of the circuit components and interconnections for the design, as well as information about circuit primitives such as transistors and diodes, their sizes and interconnections, for example, resulting in netlists at various abstraction and hierarchical levels. A layout designer may then use the schematic 102a to create a layout representation 104a for the electronic design. The layout 104a corresponds to placement/routing activities to implement geometric shapes of different materials on the layout to create the various electrical components on an integrated circuit and to represent electronic and circuit IC components as geometric objects with varying shapes and sizes.

Many phases of electronic design process may be performed with computer aided design (CAD) tools or electronic design automation (EDA) systems. For example, a schematic editing tool may be used to create, edit, and/or perform verification operations of a schematic representation of a circuit design. A layout editing tool may be used to create, edit, and/or perform verification operations for a layout representation of the circuit design.

Figure 1B:
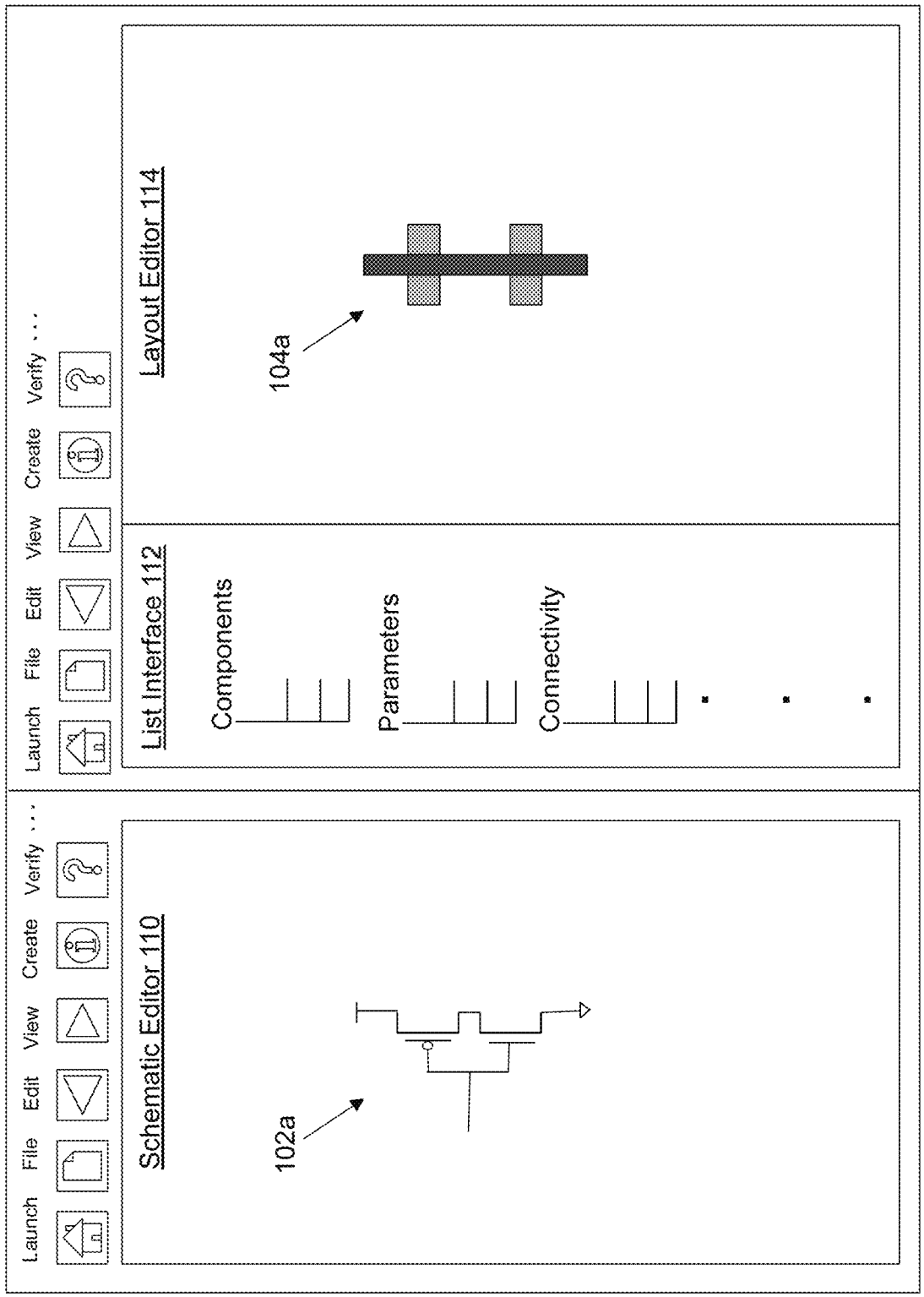

As illustrated in FIG. 1B, the EDA tools may provide one or more interfaces to allow the user (e.g., engineer or designer) to interactively and visually operate the EDA tools. In the example of FIG. 1B, the left side of the figure shows an interface for a schematic editor 110, which is used to visually show and allow manipulation of elements within a schematic 102a. The right side of the figure shows an interface for a layout editor 114, which is used to visually show and allow manipulation of geometric shapes and components within a layout 104a. A list interface 112 may be provided to display textual information about the objects within the design, such as a list of the components, interconnect, and parameters used within the design.

The list view 112 may also be used to show the results of performing certain operations on the design, such as to display the results of performing verification actions such as LVS (layout versus schematic) and to display any possible problems that are identified when running LVS. LVS is performed to check that the contents of the layout design match the contents of the schematic design, e.g., where the devices and nets of the schematic match the devices and nets of the layout. Any non-matching elements in one or the other can be identified by running the LVS operation, and displayed within the list display view 112.

Figure 1C:
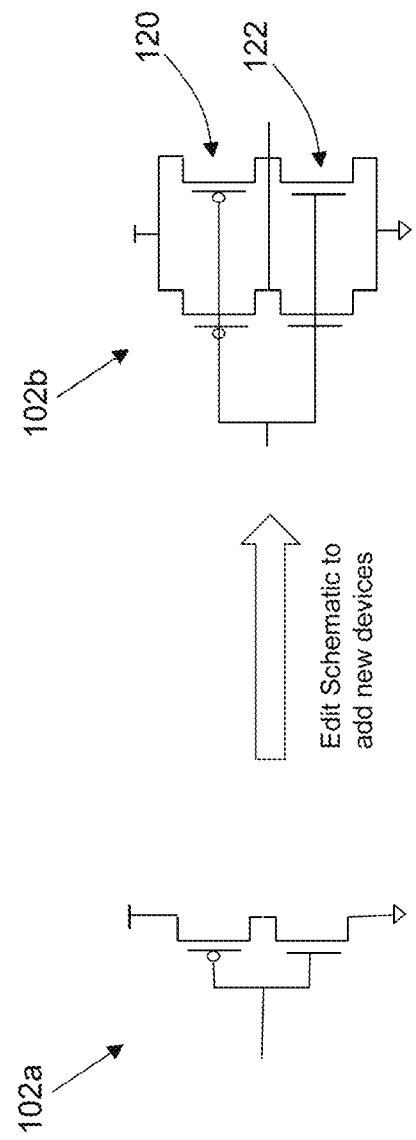

Assume that an ECO is subsequently instituted to change some aspect of the electronic design. For example, as shown in FIG. 1C, the schematic designer may implement the ECO by changing schematic 102a to a revised schematic 102b, where the changed schematic 102b now includes new devices inserted into the design such as transistors 120 and 122.

Figure 1D:
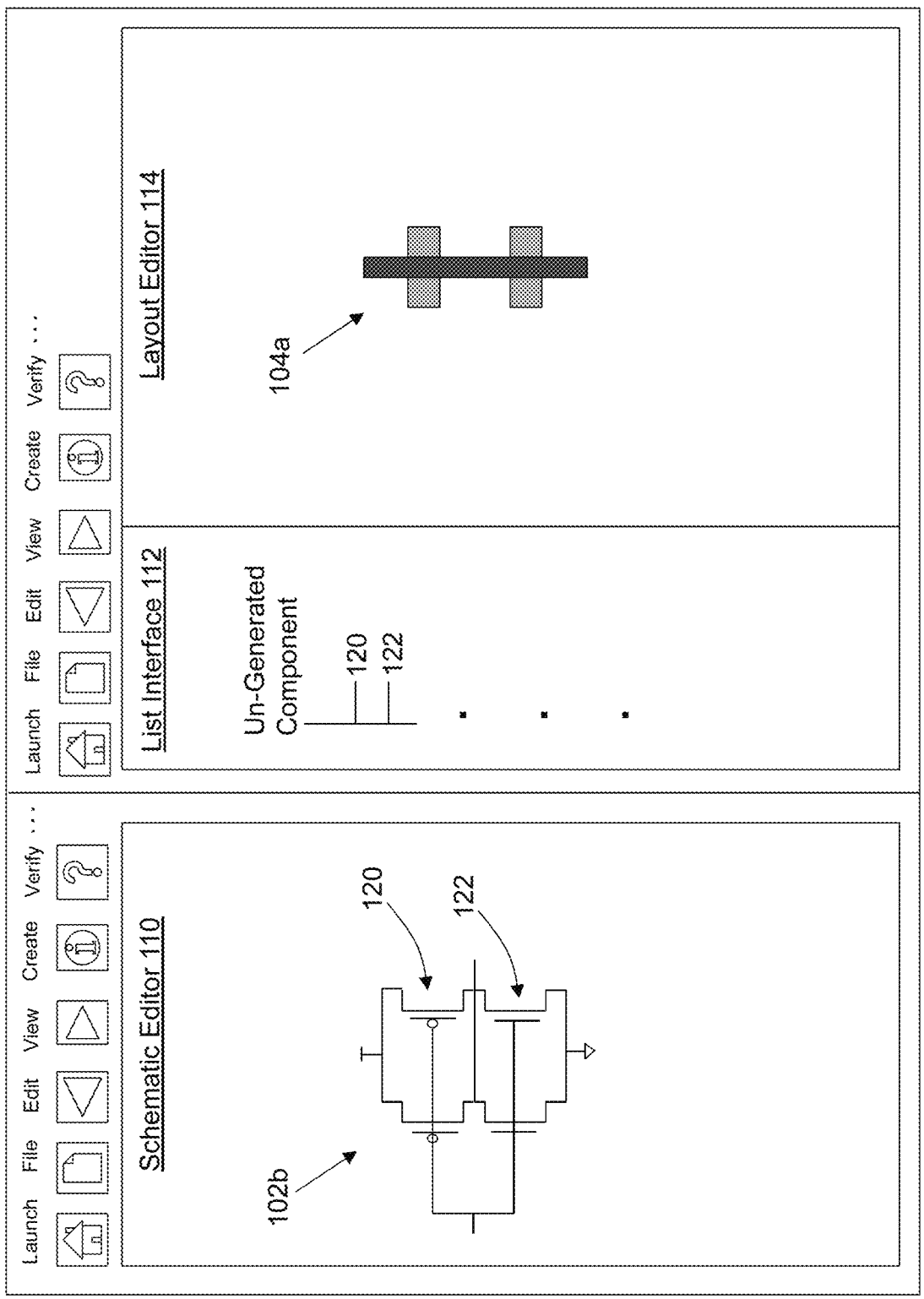

FIG. 1D provides an illustration of the EDA tool interface(s) after the revised schematic 102b has been loaded by the EDA tool. Here, the interface for the schematic editor 110 now displays the revised schematic 102b having the new devices 120 and 122. However, the old layout 104a is still being displayed in the interface of the layout tool editor 114. It is now the job of the layout designer to use the layout editor 114 to modify the current version of the layout 104a so that it can be changed to correspond to the revisions that were made to the schematic.

It is often very helpful for the layout designer to be able to visually see and understand the differences that were made to the schematic, especially as they pertain to the current version of the layout. In the example shown in the figure, the current version of the layout 104a was LVS correct relative to the previous version of the schematic 102a. However, now that the old version of the schematic 102a has been changed to the new schematic 102b, this means that the content of current layout 104a no longer correctly corresponds to the new schematic 102b. In particular, they are not LVS correct relative to each other since any new devices added to the revised schematic 102b are not represented as geometric shapes in layout 104a. The list interface 112 may include a list of un-generated components (e.g., markers) that exist in schematic 102b which are not represented within the layout 104a. The user interface may be configured to allow the designer to select one or more of the un-generated components, and to have that component highlighted in the schematic view of the design.

For example, as shown in FIG. 1E, the list interface 112 identifies components 120 and 122 as un-generated components within the design. At (1), the user may select one or more of the un-generated components (such as device 122), and at (2) the EDA tool(s) cross-select the corresponding schematic instance within the schematic view to be highlighted and/or visually focused upon within the view of the schematic 102b. From the perspective of the layout designer, this ability to be able to visually see the specific change within the schematic provides a very powerful and efficient way to assist in the process to correctly update the layout to correspond to the changes to the schematic.

The issue addressed by this disclosure is that the example interface and operational sequence shown in FIGS. 1A-E are useful when used in the context of adding a new component (or interconnect) to a schematic. However, this approach becomes problematic when used in the context of deleting a component or interconnect from the schematic.

Figure 2A:
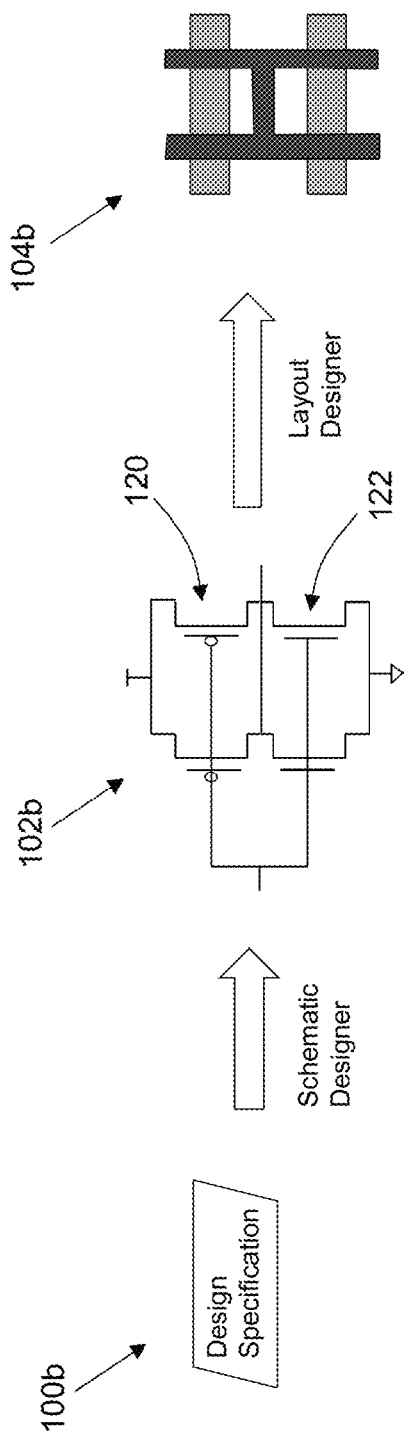
FIGS. 2A-E provide another illustration of background details regarding a schematic change to an electronic design.

To explain, consider the illustrative example of FIGS. 2A-E. FIG. 2A shows a design specification 100b that is used by a schematic designer to create a schematic representation 102b of the electronic design. A layout designer then uses the schematic 102b to create a layout representation 104b for the electronic design. The difference between the current example and the previous example is that the schematic 102b initially includes devices 120 and 122 which are also represented within the initial layout 104b.

Figure 2B:
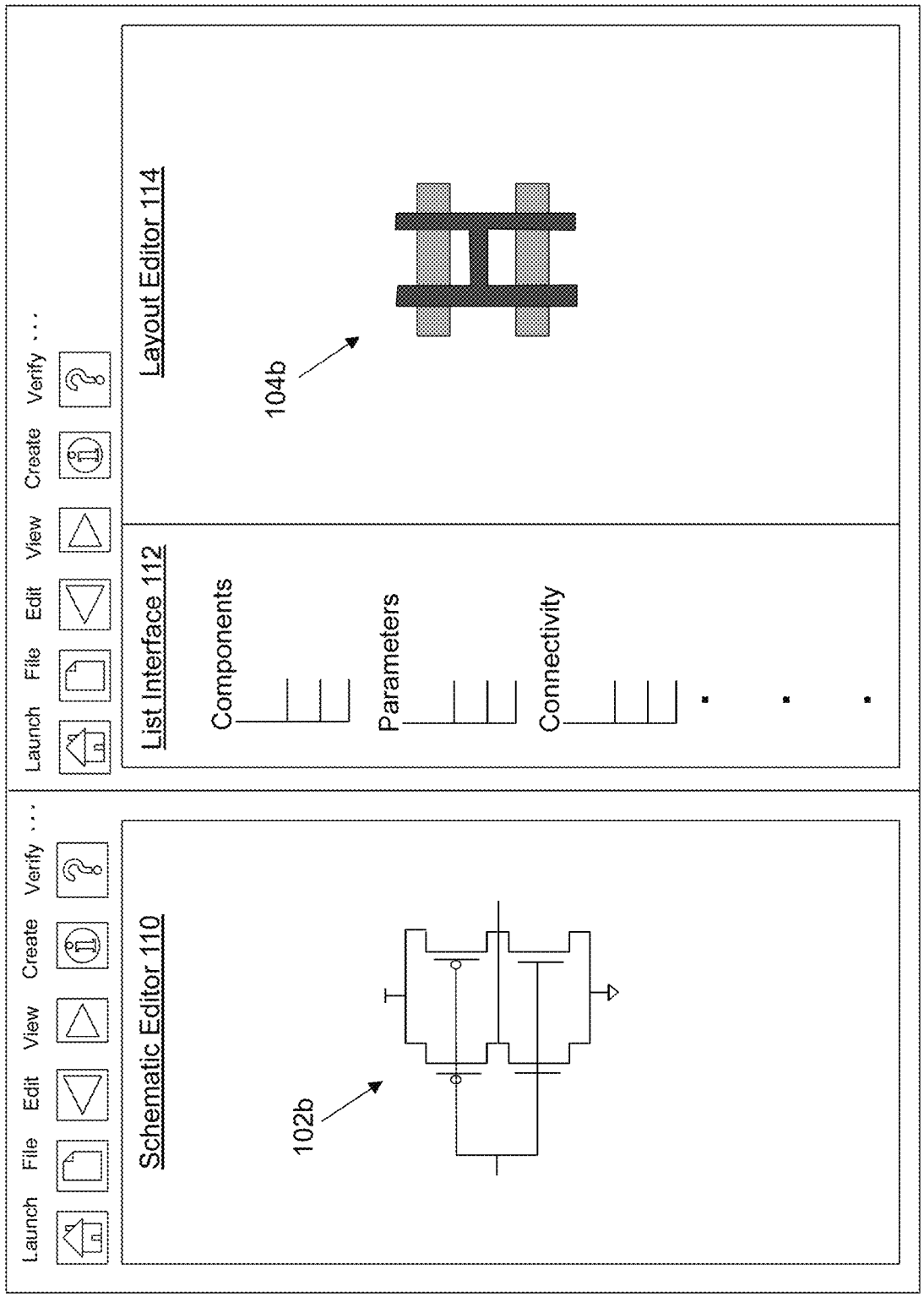

In FIG. 2B, the left side of the figure shows an interface for a schematic editor 110, which displays the schematic 102b. The right side of the figure shows an interface for the layout editor 114, which currently displays the layout 104b that corresponds to the schematic 102b.

Figure 2C:
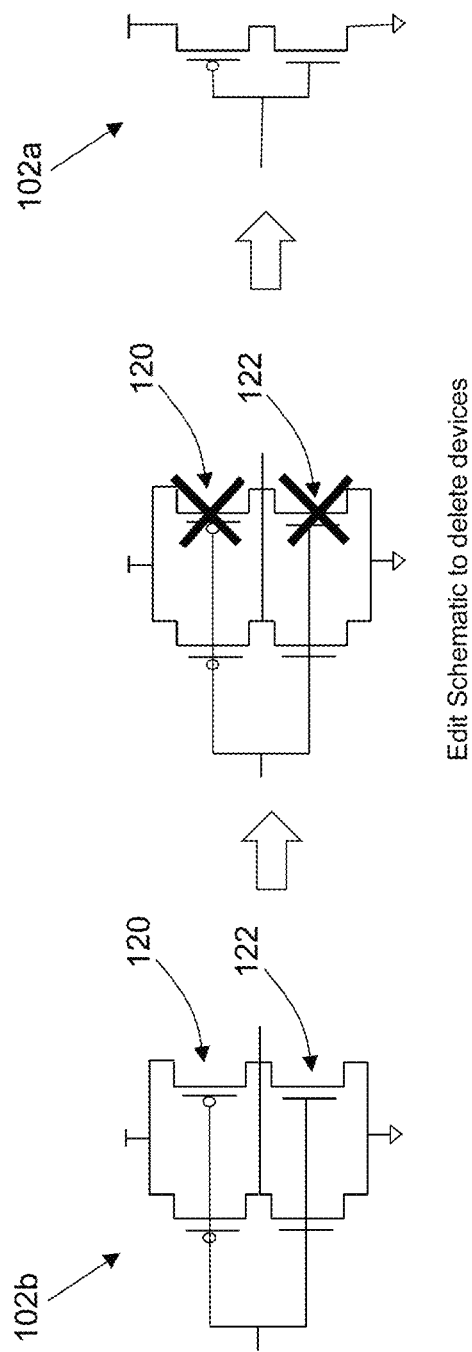

Assume that an ECO is subsequently instituted to change some aspect of the electronic design. For example, as shown in FIG. 2C, the schematic designer may implement the ECO by changing schematic 102b to the revised schematic 102a, where the changed schematic 102b has now removed devices from the schematic. In particular, transistors 120 and 122 have been removed from the schematic.

Figure 2D:
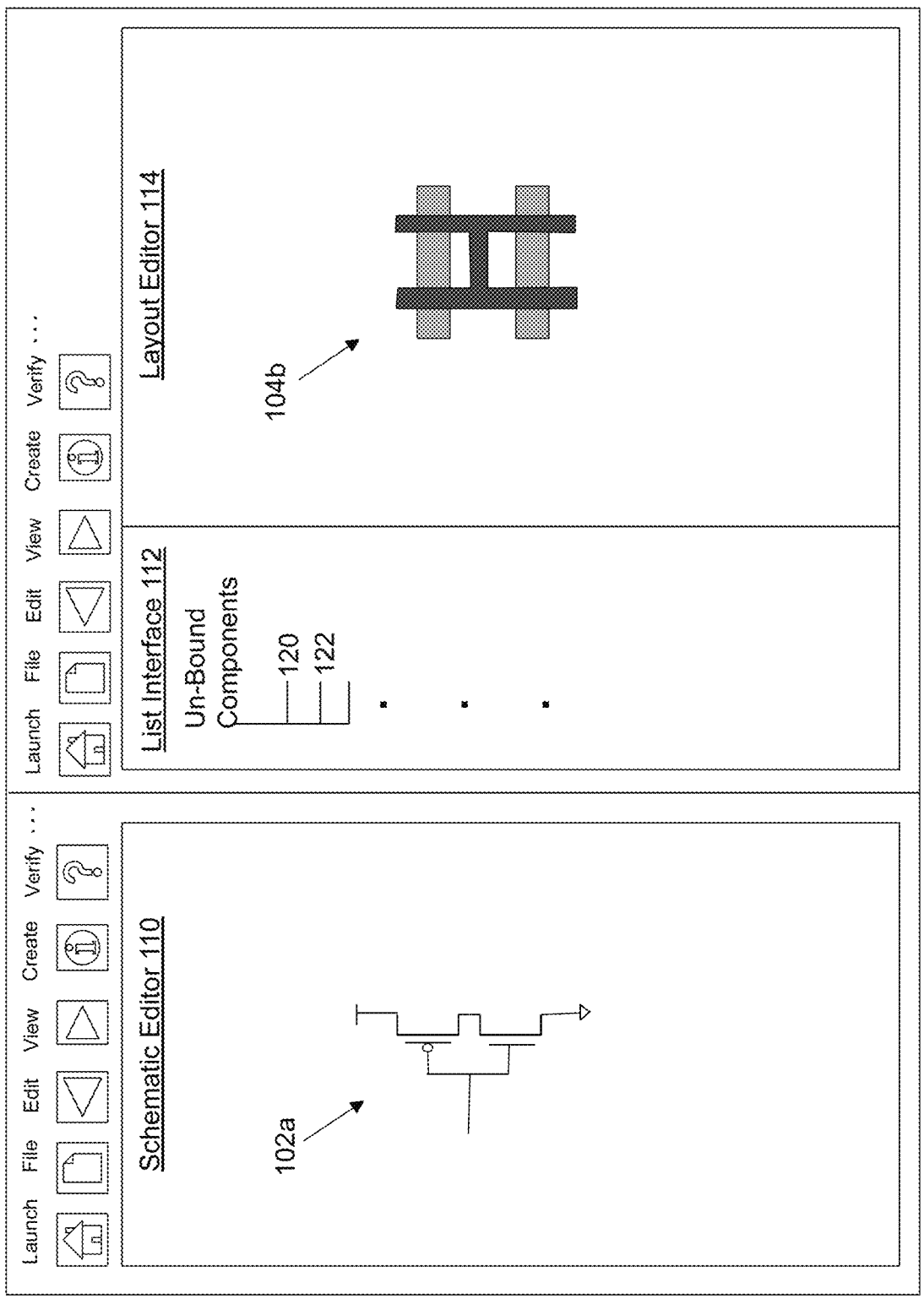

FIG. 2D provides an illustration of the EDA tool interface(s) after the revised schematic 102a has been loaded by the EDA tool. Here, the interface for the schematic editor 110 now displays the revised schematic 102a which no longer includes the devices 120 and 122. However, the old layout 104b is still being displayed in the interface of the layout tool editor 114.

The layout designer may want to visually see the differences that were made to the schematic. In particular, the layout designer may want to visually understand the change by selecting one of the un-bound components (e.g., an instance marker) that is presented in the list interface 112 that corresponds to a deleted device from the schematic.

Figure 2E:
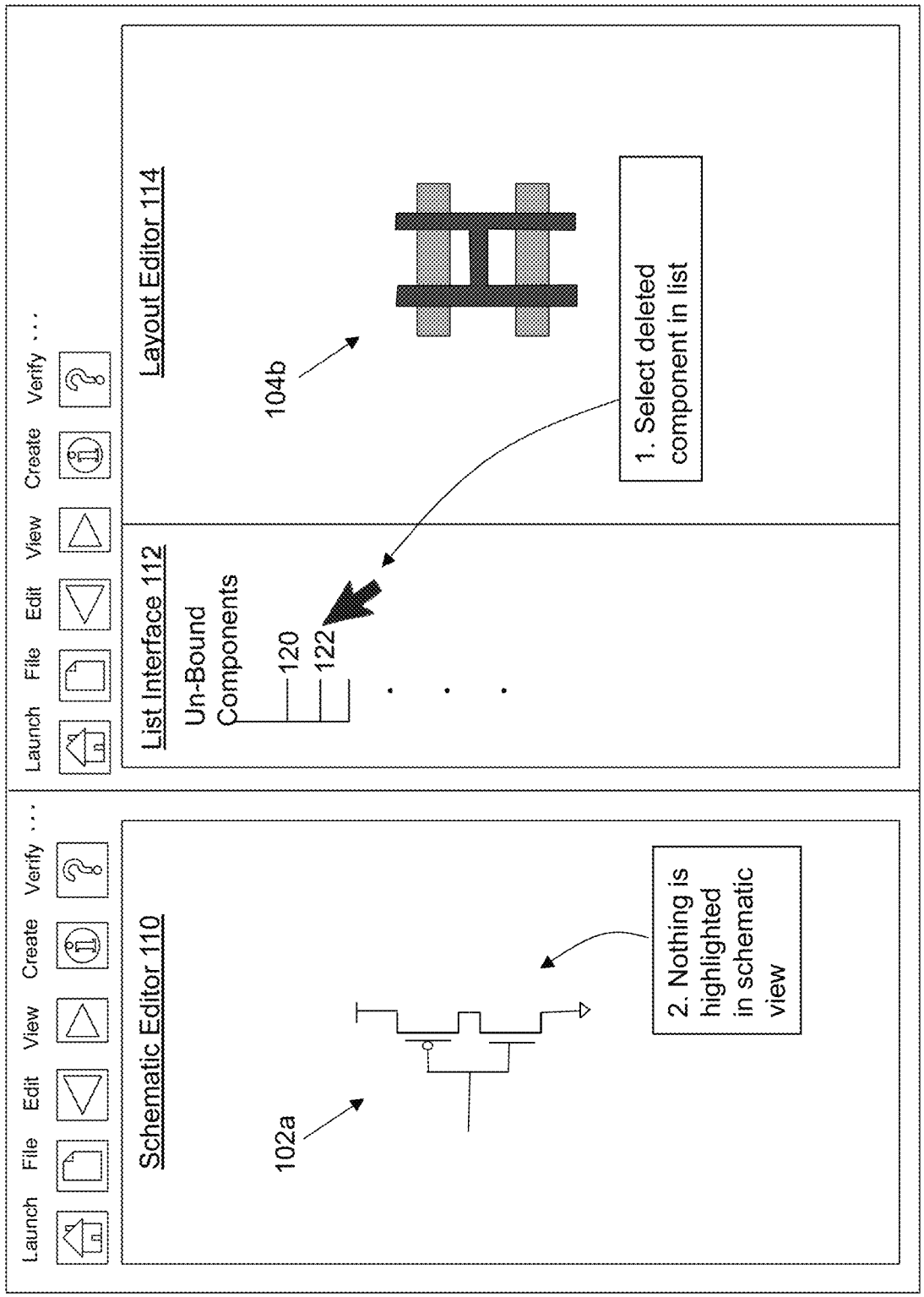

However, as shown in FIG. 2E, the problem is that the view of the revised schematic 102a in the interface for the schematic editor 110 does not include any representation of the deleted devices. Therefore, even if at (1) the user selects one of the un-bounds components from the list view interface 122 (e.g., for deleted component 122), at (2) the deleted component cannot be visually highlighted—since it does not exist in schematic 102a.

The current figures provides very simple examples of this visualization problem for an extremely small portion of a design schematic having a small number of changes. However, consider the fact that a modern electronic design may include many thousands or even millions of design elements that are included in a schematic, and an ECO may result in the change to any number of these elements within the schematic. The inability to visualize deleted elements within the schematic means that the layout designer is often faced with a true "needle in the haystack" problem when attempting to identify and comprehend what has changed within the design. This problem in turn may lead to unintended errors when attempting to edit the layout to correspond to the changed schematic, which may cause functional or performance problems for the electronic design, create problems when attempting to identify and debug errors, and/or lead to unacceptable delays in the design process.

The solution according to some embodiments of the invention is to provide multiple schematic view interfaces, where a first schematic interface displays an older schematic version and a second schematic interface displays a newer schematic version. Coordination is performed between the multiple schematic views such that an element within any of the first or second schematic views is appropriately highlighted based upon a user input.

Figure 3:
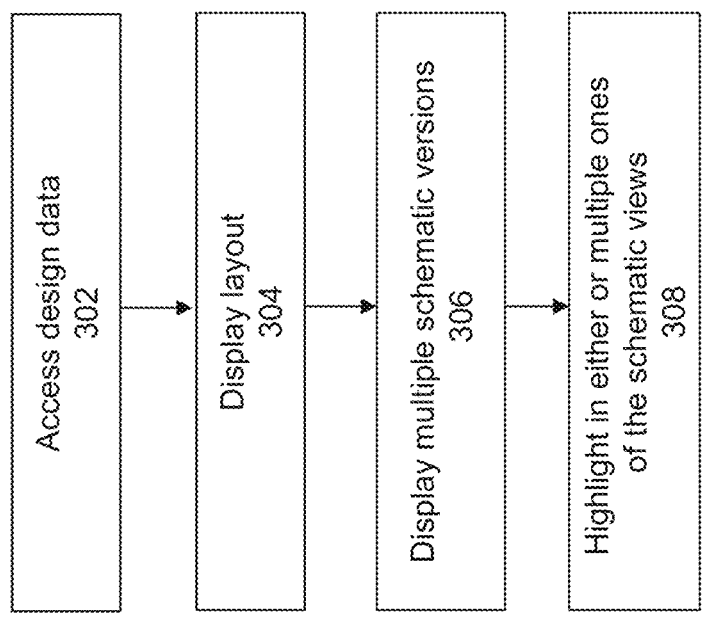
FIG. 3 shows a high-level flowchart of some embodiments of the invention. At 302, design data is accessed by the EDA tool(s).

FIG. 3 shows a high-level flowchart of some embodiments of the invention. At 302, design data is accessed by the EDA tool(s). The design data includes at least the schematic data and layout data for a given electronic design. After ECO activity by a schematic designer, the design data may now also include schematic data for a new schematic. At 304, the layout data is displayed within an interface for a layout editing tool.

At 306, multiple schematic views are displayed within the user interface of the EDA tools. In one embodiment, a separate interface component (e.g., window) is provided for each of the schematic view. A first interface window is provided to display earlier schematic data and a second interface window is provided to display revised schematic data. It is noted that in one embodiment, the layout interface initially displays a version of the layout that corresponds to the earlier schematic data (at least until the layout editor edits the layout).

At 308, highlighting or element focusing may be applied to any of or both of the first schematic view or second schematic view, depending upon the desired actions taken by the user. For example, an element that is added to a schematic could be highlighted in the new schematic view interface, while an element that is deleted a schematic could be highlighted in the old schematic view.

Figure 4A:
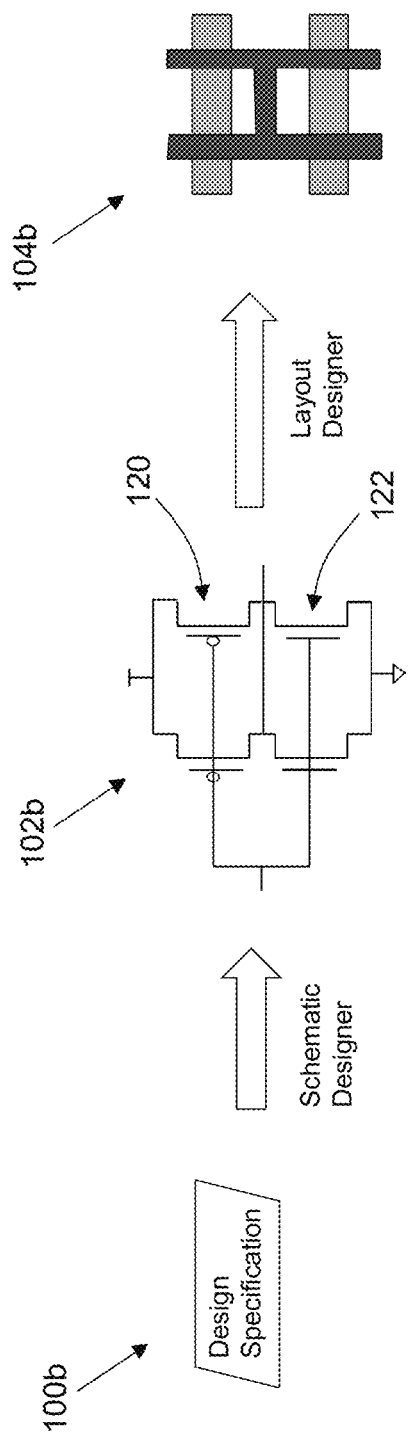
FIGS. 4A-D provide an illustrative example according to some embodiments of the invention.

FIGS. 4A-D provide an illustrative example according to some embodiments of the invention. As in the previous example, FIG. 4A shows a design specification 100b that is used by a schematic designer to create a schematic representation 102b of the electronic design. A layout designer then uses the schematic 102b to create a layout representation 104b for the electronic design. As before, assume that an ECO is subsequently instituted to change some aspect of the electronic design.

Figure 4B:
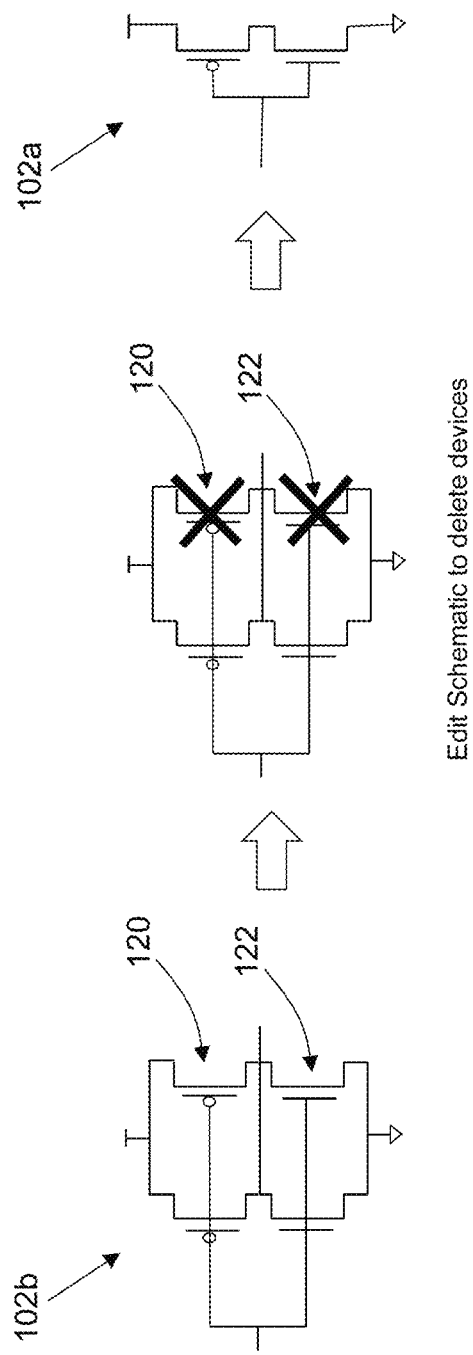

FIG. 4B shows how the schematic designer may implement the ECO by changing schematic 102b to the revised schematic 102a, where the changed schematic 102b has now removed devices from the schematic (where transistors 120 and 122 have been removed from the schematic).

Figure 4C:
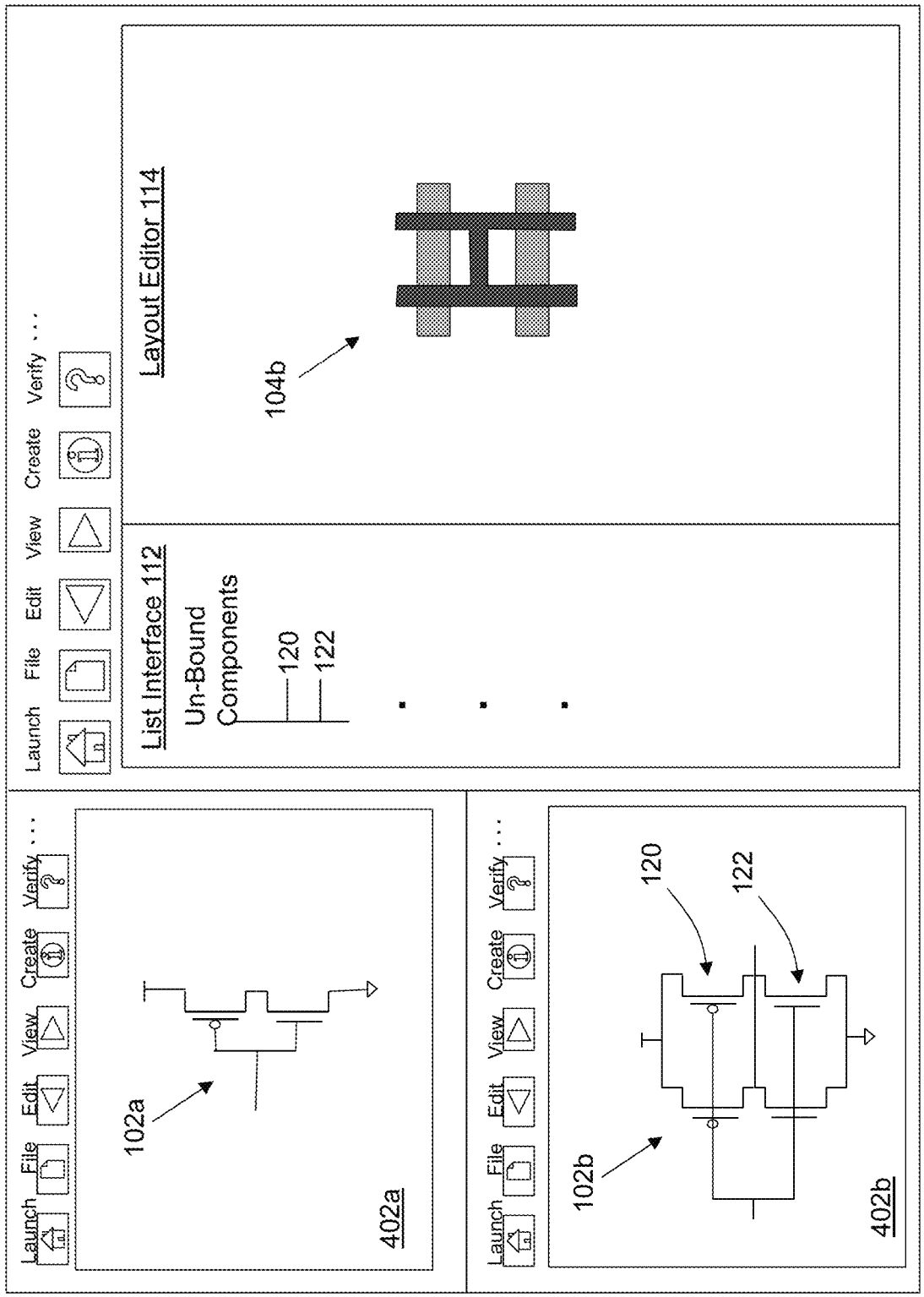

FIG. 4C provides an illustration of an EDA tool interface, where multiple schematic view interfaces are provided. In particular, a first schematic interface 402a is used to display the newer/revised version of the schematic 102a and a second schematic interface 402b is used to display an older version of the schematic 102b. The interface for the layout editor 114 displays the version of the layout 104b that corresponds to the older version of the schematic 102b.

By providing multiple schematic views, this permits the graphical user interface (GUI) of the EDA tool to adaptively highlight of any element within the schematic(s), regardless of whether the element is newly added, deleted, or just simply changed in some way between the old schematic and the new schematic.

Recall that when only a single schematic interface is presented that displays only the new schematic, this situation is problematic since it is not possible to visually highlight any deleted elements from the schematic. However, with the present embodiment, the deleted elements can highlighted by going to the interface view for the old schematic, and modifying the visual presentation of the schematic in the interface to highlight the deleted elements.

Figure 4D:
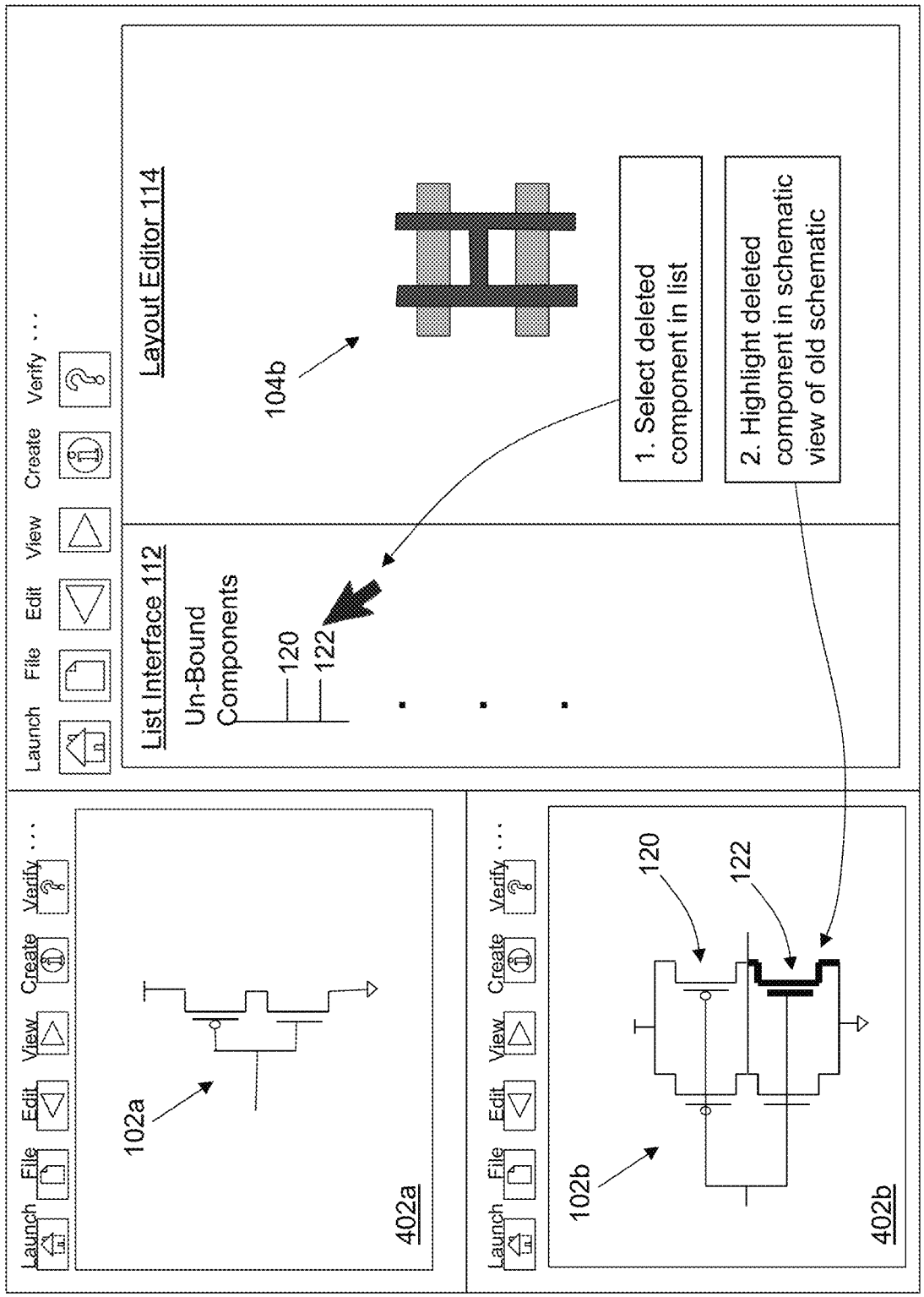

This is illustratively shown in FIG. 4D. The schematic designer had implemented the ECO by changing schematic 102b to the revised schematic 102a, where the changed schematic 102a is modified to remove devices 120 and 122 from the old version of the schematic 102b. The list interface 112 may include a list of unbound components (e.g., instance markers) that corresponds to a listing of deleted components. Here, if at (1) the user selects one of the un-bounds components from the list view interface 122 (e.g., for deleted component 122), then at (2) the deleted component can be visually highlighted by manipulating the schematic interface display 402b for the old version of the schematic 102b to visually highlight in some way the component 122 selected by the user.

While not shown here, it is noted that highlighting may also be applied to the schematic interface 402*a* that shows the new version of the schematic 102*a*. For example, if any components have been added to the new schematic, then any un-generated markers could be cross-selected and visually highlighted in the schematic interface 402*a* for the new version of the schematic 102*a*.

This approach provides numerous advantages for the layout designer. By including multiple schematic view interfaces, this permits the layout designer to visually see the differences that were made to the schematic regardless of whether components are added or deleted or when the schematic is otherwise modified. In addition, while the illustrative examples are shown in the context of a device being added or deleted, it is noted that the inventive concept disclosed herein is applicable to highlight any type of change that can be made to a schematic. For example, the inventive concepts disclosed herein may be applied to highlight interconnect elements that are added or deleted from a schematic in addition to components. In addition, the inventive concepts disclosed herein may be applied to highlight any parameter changes that may be implemented for any elements within a schematic.

Figure 5:
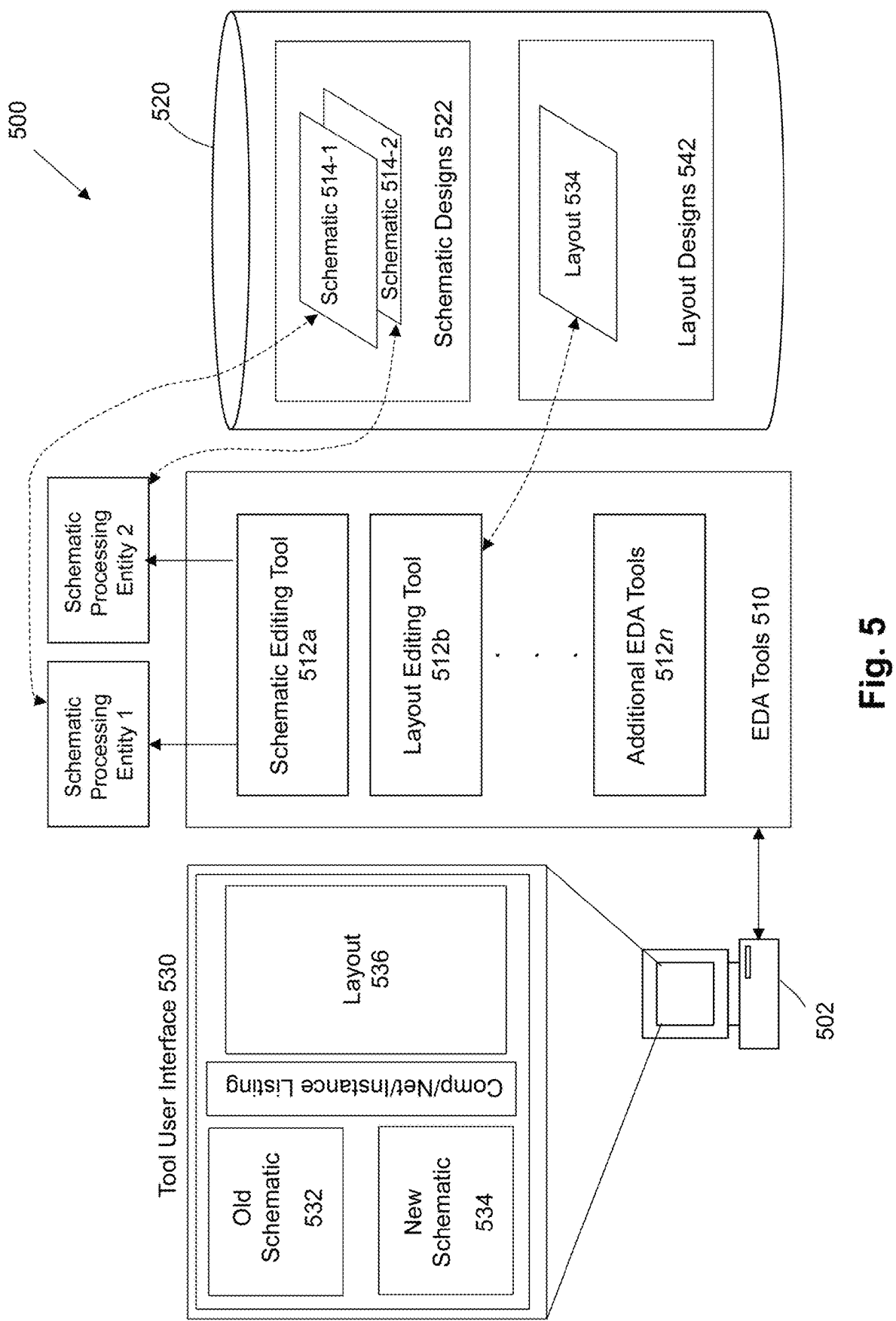
FIG. 5 illustrates an example system which may be employed in some embodiments of the invention to implement/edit a design layout.

FIG. 5 illustrates an example system 500 which may be employed in some embodiments of the invention to implement/edit a design layout. System 500 includes one or more users at one or more user stations 502 that operate the system 500 to design or edit electronic designs. Such users include, for example, design engineers or verification engineers. User station 502 comprises any type of computing station that may be used to operate, interface with, or implement EDA applications/tools 510 that operate on a user station, server, or as a cloud application. Examples of such user stations 502 include for example, workstations, personal computers, or remote computing terminals. User station 502 comprises a display device, such as a display monitor, for displaying electronic design schematics, layouts, and processing results to users at the user station 502. User station 502 also comprises one or more input devices for the user to provide operational control over the activities of system 500, such as a mouse or keyboard to manipulate a pointing object in a graphical user interface to generate user inputs.

The electronic design data may be stored in a computer readable storage device 520. Computer readable storage device 520 comprises any combination of hardware and software that allows for ready access to the data that is located at the computer readable storage device 520. For example, computer readable storage device 520 could be implemented as computer memory operatively managed by an operating system. The computer readable storage device 520 could also be implemented as an electronic database system having storage on persistent and/or non-persistent storage. The computer readable storage device 520 could also be implemented as storage located within a cloud-based storage system. The design data stored within storage device 520 may be organized using any suitable approach. For example, the OpenAccess, available from the OpenAccess Coalition, may be used as the standard for database access and storage technology for organization of the design data used within system 500.

One or more computer aided design (CAD) tools or EDA tools 510 may be implemented and used by users at a user station 502 to create or edit an electronic design. In embodiments of the invention, the EDA tools 510 include a schematic editing tool 512*a* and a layout editing tool 512*b*. Other and additional tools 512*n* may also be provided within system 500, including for example, electronic design simulation and verification tools.

To design an integrated circuit, a designer first creates high level behavior descriptions of the IC device using a high-level hardware design language. The EDA tools 510 may be used to receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example. An integrated circuit designer may use a set of layout EDA application programs to create a physical integrated circuit design layout from a logical circuit design. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. A layout file 534 is created from the placement and routing process, which assigns logic cells to physical locations in the device layout and routes their interconnections. The physical layout is typically described as many patterned layers, and the pattern of each layer is described by the union of a set of polygons. Component devices and interconnections of the integrated circuit are constructed layer by layer. A layer is deposited on the wafer and then it is patterned using a photolithography process and an etch process. One or more photomasks may then be created from the layout file for the photolithography of each layer. Photomasks are used to transfer the layout pattern onto the physical layer on the wafer. A photomask, or mask, provides an image of the desired physical geometries of the respective integrated circuit layer. Passing light through the mask projects the layout pattern for the layer onto the wafer. An imaging lens system projects and focuses the layout onto the substrate. The projected light pattern interacts with a photosensitive resist coating on the wafer and, resist portions that are exposed to light are rendered either soluble or insoluble in a developer solution, depending on the type of the photoresist. Accordingly, the mask pattern is transferred into the photo-resist by optical projection and chemical reactions. The photo-resist pattern is subsequently transferred to an underlying layer by an etch process. Most commonly, plasma containing chemically-selective reactive ions is used to etch high-aspect ratio trenches and holes with close to vertical sidewalls.

The EDA tools may present a user interface 530 that is displayed and interactively operated by a user at user station 502. The user interface 530 may include a layout editor interface 536, which is used to control and operate the actions of the layout editor 512*b* to create or edit a layout file 534 within layout design database (DB) 542.

The user interface 530 may also include multiple schematic editor interfaces. Here, the user interface includes a first schematic interface 532 to display an older version of a schematic and a second schematic interface 534 to display a newer version of a schematic. While only two schematic interfaces are shown in this figure, it is noted that embodiments of the invention may deploy any number of schematic interfaces as desired to display any number of schematic versions.

Within the system 500, a separate processing entity may be employed to implement each schematic interface. For example, system 500 may instantiate a first process 1 for the schematic editor 512a to implement the first schematic interface 532, while simultaneously instantiating a second process 2 for the schematic editor 512a to implement the second schematic interface 534. Each would run as a separate and distinct process that operates upon its own respective schematic version (514-1 or 514-2) within the database of schematic designs 522. It is noted that any suitable type of processing entity may be employed within the system. While the example is described in the context of using a process as a processing entity, other types of processing entities may also be used to implement each instance of the schematic editor. For example, other types of processing entities that may be employed include threads, virtual machines, and containers.

Figure 6:
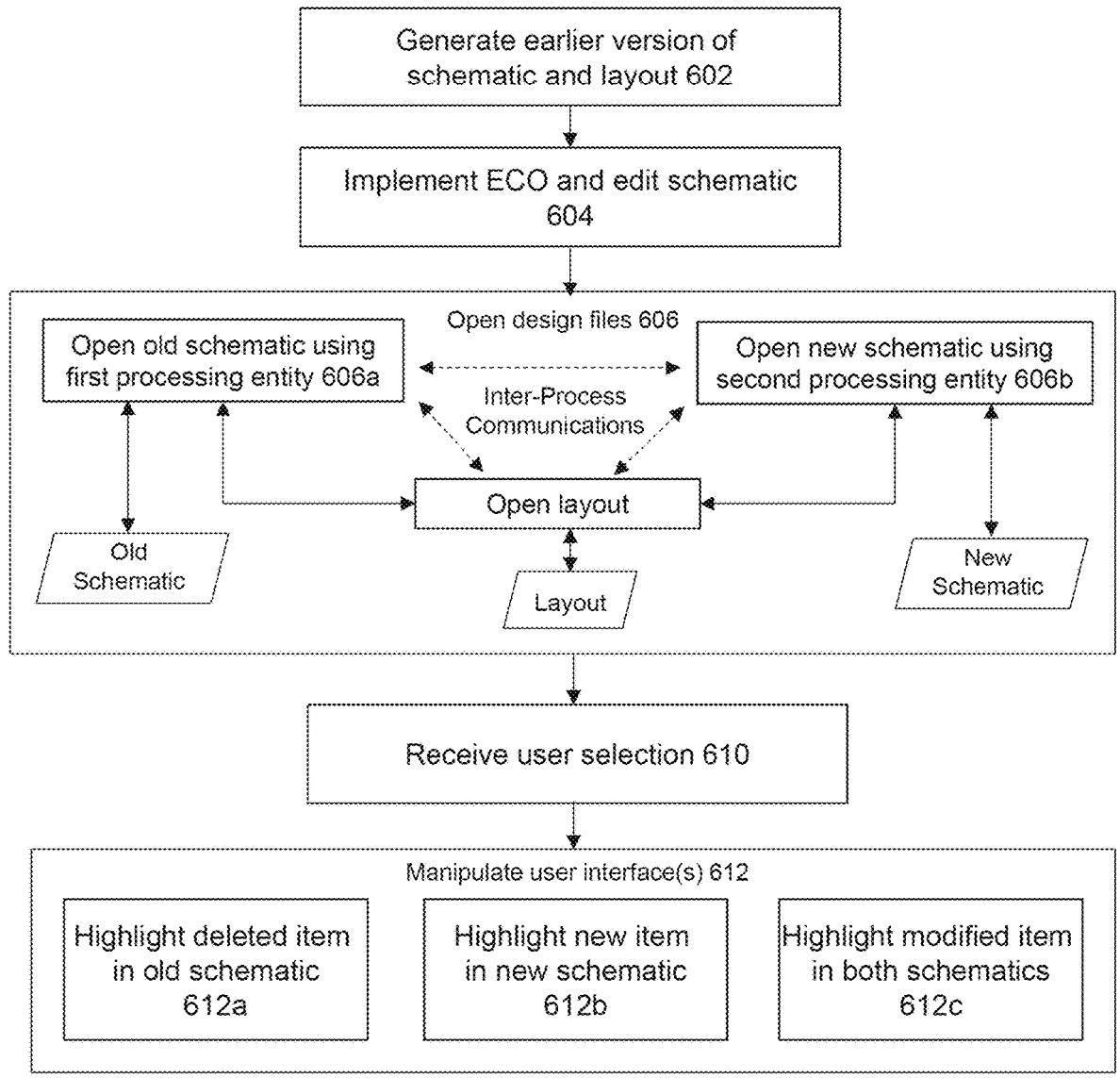
FIG. 6 shows a flowchart of an approach to implement some embodiments of the invention.

FIG. 6 shows a flowchart of an approach to implement some embodiments of the invention. At 602, an earlier version of a schematic and a layout is generated by one or more EDA tools within the system. The schematic may be created by a schematic designer and the layout may be created by a layout designer using the schematic. LVS processing may also be performed to verify that the contents of the schematic matches the contents of the layout.

At 604, an ECO may be implemented by editing the earlier version of the schematic to create a revised version of the schematic. The revised schematic may include any suitable type of change to the schematic. For example, the revised schematic may include the addition of one or more elements, removal of one or more elements, or the change to one or more parameters for elements within the design.

The updated schematic may then be used by the layout designer to edit the earlier layout. At 606, the layout designer may open the relevant design files. With embodiments of the invention, multiple processes are employed to open respective schematic versions. At 606a, a first process is used to open the earlier version of the schematic and create a first binding session for the earlier schematic relative to the earlier version of the layout. At 606b, a second process is used to open the newer version of the schematic and create a second binding session of the new schematic relative to the earlier version of the layout.

Coordination is performed between the multiple processes that have opened the different sessions relative to the different schematic versions. Inter-process communications (IPC) may be used to implement the coordination between the various processes. Any suitable type of type of IPC mechanism may be employed to implement cooperation between the different schematic processes. For example, message passing and/or memory sharing may be used to coordinate the activities between the multiple processes that handle the different schematic views.

At 610, a user selection may be received by the system from the user/designer that is operating the EDA tools. The user selection may be to select one or more items from a list view that is presented to the user. For example, a list view may be presented that identifies un-bound or un-generated elements within the layout, e.g., based upon an LVS analysis.

At 612, the user interfaces are manipulated to provide a visual indication of a change that occurred to the schematic based upon the user selection. In operation, the user selection is used by the system to identify an element identifier within the schematic(s). That element identifier is provided to and used by each of the schematic processes. Each of the schematic processes separately determines, in parallel, whether the identified element exists within the respective schematic. If so, then that schematic process will highlight the identified element, e.g., by drawing a visual box around the element or using any other suitable type of highlighting to focus on the element.

Different types of manipulations may occur based upon the type of change that has occurred to the schematic. If an item has been deleted from the schematic, then that item is likely to only exist in the old schematic but not the new schematic. Therefore, at 612a, the deleted item is highlighted in the old schematic. If an item has been added to the schematic, then that item is likely to only exist in the new schematic but not the old schematic. Therefore, at 612b, the added item is highlighted in the new schematic. If an existing item is modified but not deleted from the schematic, then that item is likely to exist in both the old and new schematics. Therefore, at 612c, the modified item can be highlighted in both the old and new schematics.

Therefore, what has been disclosed above is an improved method and system for visualizing schematic changes for an electronic design, where multiple schematic view interfaces are provided such that a first schematic interface displays an older schematic version and a second schematic interface displays a newer schematic version. Coordination is performed between the multiple schematic views such that an element within any of the first or second schematic views is appropriately highlighted based upon a user input. This approach is extremely beneficial since, by including multiple schematic view interfaces, this permits the layout designer to visually see the differences that were made to the schematic regardless of whether schematic elements are added, deleted, and/or modified.

System Architecture Overview

Figure 7:
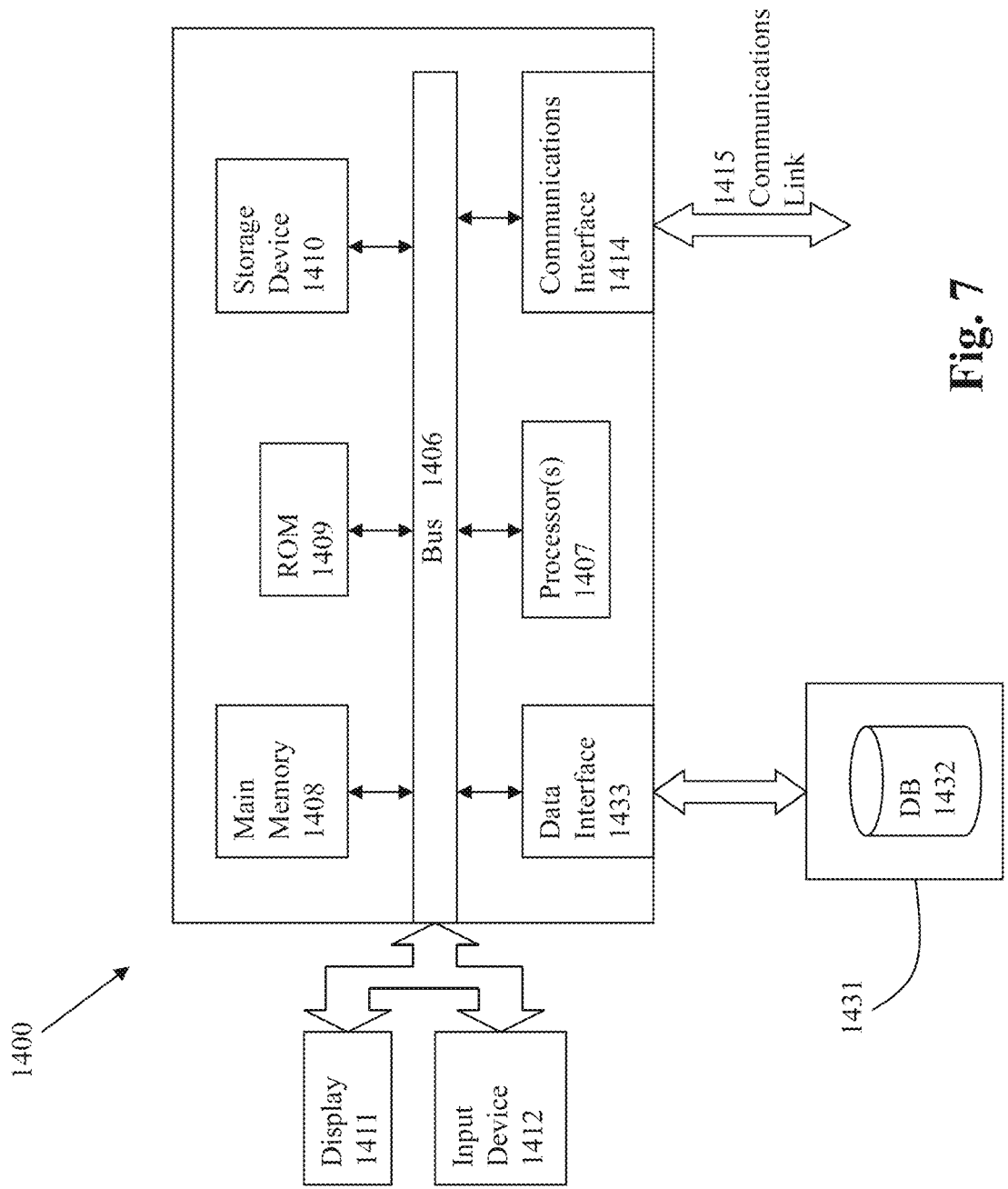
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media.

Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another. Data may be accessed on a database 1432 on a storage device 1432 through a data interface 1433.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method implemented with a processor, the method comprising:
   identifying a first version of a schematic for an electronic design;
   identifying a second version of the schematic for the electronic design;
   identifying a layout for the electronic design;
   implementing a user interface having a first schematic view interface that displays the first version of the schematic, a second schematic view interface that displays the second version of the schematic, and a layout view that displays the layout of the electronic design;
   receiving a selection that corresponds to a changed element in either or both of the first and second versions of the schematic; and
   selectively highlighting the changed element in at least one of the first schematic view interface that displays the first version of the schematic or the second schematic view interface that displays the second version of the schematic.

2. The method of claim 1, in which a first processing entity implements the first schematic view interface that displays the first version of the schematic and a second processing entity implements the second schematic view interface that displays the second version of the schematic.

3. The method of claim 2, in which the first and second processing entities are implemented using a processing entity type that corresponds to at least one of a process, a thread, a virtual machine, or a container.

4. The method of claim 2, in which an inter-process communications mechanism is used to implement coordination between the first processing entity and the second processing entity.

5. The method of claim 1, wherein the layout corresponds to the first version of the schematic, and both the first schematic view interface and the second schematic view interface are tied to the layout.

6. The method of claim 1, wherein a list interface is displayed that visually presents the changed element in the list interface.

7. The method of claim 6, wherein the changed element is identified in the list interface based at least upon operation of LVS (layout versus schematic) processing, and the list interface identifies at least one of an un-bound marker or an un-generated marker.

8. A computer program product embodied on a non-transitory computer readable medium having stored thereon a sequence of instructions which, when executed by a processor causes a set of acts comprising:
   identifying a first version of a schematic for an electronic design;
   identifying a second version of the schematic for the electronic design;
   identifying a layout for the electronic design;
   implementing a user interface having a first schematic view interface that displays the first version of the schematic, a second schematic view interface that displays the second version of the schematic, and a layout view that displays the layout of the electronic design;
   receiving a selection that corresponds to a changed element in either or both of the first and second versions of the schematic; and
   selectively highlighting the changed element in at least one of the first schematic view interface that displays the first version of the schematic or the second schematic view interface that displays the second version of the schematic.

9. The computer program product of claim 8, in which a first processing entity implements the first schematic view interface that displays the first version of the schematic and a second processing entity implements the second schematic view interface that displays the second version of the schematic.

10. The computer program product of claim 9, in which the first and second processing entities are implemented using a processing entity type that corresponds to at least one of a process, a thread, a virtual machine, or a container.

11. The computer program product of claim 9, in which an inter-process communications mechanism is used to implement coordination between the first processing entity and the second processing entity.

12. The computer program product of claim 8, wherein the layout corresponds to the first version of the schematic, and both the first schematic view interface and the second schematic view interface are tied to the layout.

13. The computer program product of claim 8, wherein a list interface is displayed that visually presents the changed element in the list interface.

14. The computer program product of claim 13, wherein the changed element is identified in the list interface based at least upon operation of LVS (layout versus schematic) processing, and the list interface identifies at least one of an un-bound marker or an un-generated marker.

15. A system, comprising:

a processor;

a memory for holding a sequence of instructions; and wherein the sequence of instructions includes instructions for identifying a first version of a schematic for an electronic design; identifying a second version of the schematic for the electronic design; identifying a layout for the electronic design; implementing a user interface having a first schematic view interface that displays the first version of the schematic, a second schematic view interface that displays the second version of the schematic, and a layout view that displays the layout of the electronic design; receiving a selection that corresponds to a changed element in either or both of the first and second versions of the schematic; and selectively highlighting the changed element in at least one of the first schematic view interface that displays the first version of the schematic or the second schematic view interface that displays the second version of the schematic.

16. The system of claim 15, in which a first processing entity implements the first schematic view interface that displays the first version of the schematic and a second processing entity implements the second schematic view interface that displays the second version of the schematic.

17. The system of claim 16, in which the first and second processing entities are implemented using a processing entity type that corresponds to at least one of a process, a thread, a virtual machine, or a container.

18. The system of claim 16, in which an inter-process communications mechanism is used to implement coordination between the first processing entity and the second processing entity.

19. The system of claim 15, wherein the layout corresponds to the first version of the schematic, and both the first schematic view interface and the second schematic view interface are tied to the layout.

20. The system of claim 15, wherein a list interface is displayed that visually presents the changed element in the list interface.

21. The system of claim 20, wherein the changed element is identified in the list interface based at least upon operation of LVS (layout versus schematic) processing, and the list interface identifies at least one of an un-bound marker or an un-generated marker.

* * * * *